United States Patent
Thyagarajan

(10) Patent No.: US 11,233,473 B2
(45) Date of Patent: Jan. 25, 2022

(54) METHOD AND SYSTEM FOR CONTROLLING A PERMANENT MAGNET MACHINE WITHOUT A MECHANICAL POSITION SENSOR

(71) Applicant: Deere & Company, Moline, IL (US)

(72) Inventor: Lav Thyagarajan, West Fargo, ND (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 16/598,664

(22) Filed: Oct. 10, 2019

(65) Prior Publication Data

US 2020/0280276 A1   Sep. 3, 2020

Related U.S. Application Data

(60) Provisional application No. 62/812,368, filed on Mar. 1, 2019.

(51) Int. Cl.
| | |
|---|---|
| *H02P 21/13* | (2006.01) |
| *H02P 21/18* | (2016.01) |
| *H02P 21/22* | (2016.01) |
| *H02P 27/12* | (2006.01) |

(52) U.S. Cl.
CPC .............. *H02P 21/13* (2013.01); *H02P 21/18* (2016.02); *H02P 21/22* (2016.02); *H02P 27/12* (2013.01)

(58) Field of Classification Search
CPC .......... H02P 6/182; H02P 21/13; H02P 23/12; G05B 2219/37318; G05B 2219/37317; G05B 2219/42012
See application file for complete search history.

(56) References Cited

U.S. PATENT DOCUMENTS 5,565,752 A  * 10/1996 Jansen .................. H02K 17/165
                                                    310/169
2004/0070362 A1* 4/2004 Patel ....................... H02P 21/00
                                                    318/701
(Continued)

FOREIGN PATENT DOCUMENTS

| CN | 108880377 A | * 11/2018 |
| EP | 1755212 A2 | 2/2007 |
| EP | 3059851 A1 | 8/2016 |

OTHER PUBLICATIONS

Ohnuma et al. Extended EMF Observer for Wide Speed Range Sensorless Control of Salient-pole Synchronous Motor Drives, 2010, ICEM (Year: 2010).*

(Continued)

*Primary Examiner* — Bickey Dhakal

(57) ABSTRACT

A sensor is configured to sense current, of one or more output phases of an inverter, associated with back electromotive force (back EMF) of the machine. A converter or electronic data processor is adapted to convert the sensed current into current vectors associated with a stationary reference frame. An estimator or current model is configured to estimate back-EMF vectors from the converted current vectors. A vector tracking observer or the electronic data processor is adapted to mix the back-EMF vectors and applying the mixed back-EMF vectors to a preliminary inertial model. A secondary observer or the data processor is operable to apply the output of the preliminary inertial model to a secondary inertial model in the second speed range to estimate position or motion data for the rotor.

22 Claims, 9 Drawing Sheets

(56) References Cited

U.S. PATENT DOCUMENTS

2015/0084576 A1\* 3/2015 Magee ................... H02P 6/183
318/768
2019/0006971 A1 1/2019 Xu et al.
2020/0169204 A1\* 5/2020 Narasimha .............. H02P 21/22

OTHER PUBLICATIONS

European Search Report issued in counterpart application No. 20157258.3 dated Jul. 15, 2020 (10 pages).
Sigurd Ovrebon and Roy Nilsen. "New self sensing scheme based on INFORM, heterodyning and Luenberger observer," *IEEE International Electric Machines and Drives Conference, 2003. IEMDC'03.*, Madison, WI, USA, Jun. 1-4, 2003, pp. 1819-1825 vol. 3. DOI:< 10.1109/IEMDC.2003.1210700>.
Tae-Uk Jung et al. "A back-EMF estimation error compensation method for accurate rotor position estimation of surface mounted permanent magnet synchronous motors." *Energies*, vol. 10, No. 8, 16 pages, dated Aug. 7, 2017. DOI:<10.3390/en10081160>.
J. L. Kirtley, Electric Power Principles, Sources, Conversion, Distribution and Use at p. 167 (2010).
Frank M. Brown, "State-Equations Corresponding to a Time-Varying Linear Differential System," Proceedings Letters of IEEE (Mar. 30, 1967), retrieved from internet <URL: https://ieeexplore.ieee.org/document/1447695/references#references>.
R. Lee, P. Pillay, and R. Harley, D, Q Reference Frames for the Simulation of Induction Motors, Electric Power Systems Research, retrieved from internet <URL: http://users.encs.concordia.ca/~pillay/56.pdf>, Apr. 9, 1984, pp. 15-26.

\* cited by examiner

METHOD AND SYSTEM FOR CONTROLLING A PERMANENT MAGNET MACHINE WITHOUT A MECHANICAL POSITION SENSOR

RELATED APPLICATION

This application claims the benefit of the filing date of and priority to U.S. Provisional Application Ser. No. 62/812,368, filed Mar. 1, 2019, which is incorporated herein by reference in its entirety.

FIELD

This disclosure relates to a method and system for controlling a permanent magnetic machine without a mechanical position sensor.

BACKGROUND

In certain prior art, the position or speed of permanent magnet machines can be estimated by observers of voltage or current at the terminals of the permanent magnet machine. For example, in one typical prior art configuration, a Luenberger observer filters a raw position, which is then applied to an arc-tangent function to estimate the rotor position. However, the arc-tangent position estimate is susceptible to noise that can introduce inaccuracies or delay in the estimated rotor position. Accordingly, there is a need for a method and system for controlling a permanent magnetic machine, without a mechanical position sensor, such as an encoder or resolver, with greater immunity or resistance to noise.

SUMMARY

In accordance with one embodiment, a method and system for controlling a permanent magnet machine comprises a state evaluator for determining whether the machine is operating within a first speed range or a second speed range, where the second speed range is greater than the first speed range. A sensor is configured to sense current, of one or more output phases of an inverter, associated with back electromotive force (back EMF) of the machine. A converter or electronic data processor is adapted to convert the sensed current into current vectors associated with a stationary reference frame. An estimator or current model is configured to estimate back-EMF vectors from the converted current vectors. A vector tracking observer or the electronic data processor is adapted to mix (e.g., heterodyne or apply a vector cross product) the back-EMF vectors and applying the mixed (e.g., heterodyned) back-EMF vectors to a preliminary inertial model. A secondary observer or the data processor is operable to apply the output of the preliminary inertial model to a secondary inertial model in the second speed range to estimate position or motion data for the rotor (e.g., a smoothed position of the rotor of the machine versus time, rotor velocity, or rotor acceleration).

DETAILED DESCRIPTION

Figure 1:
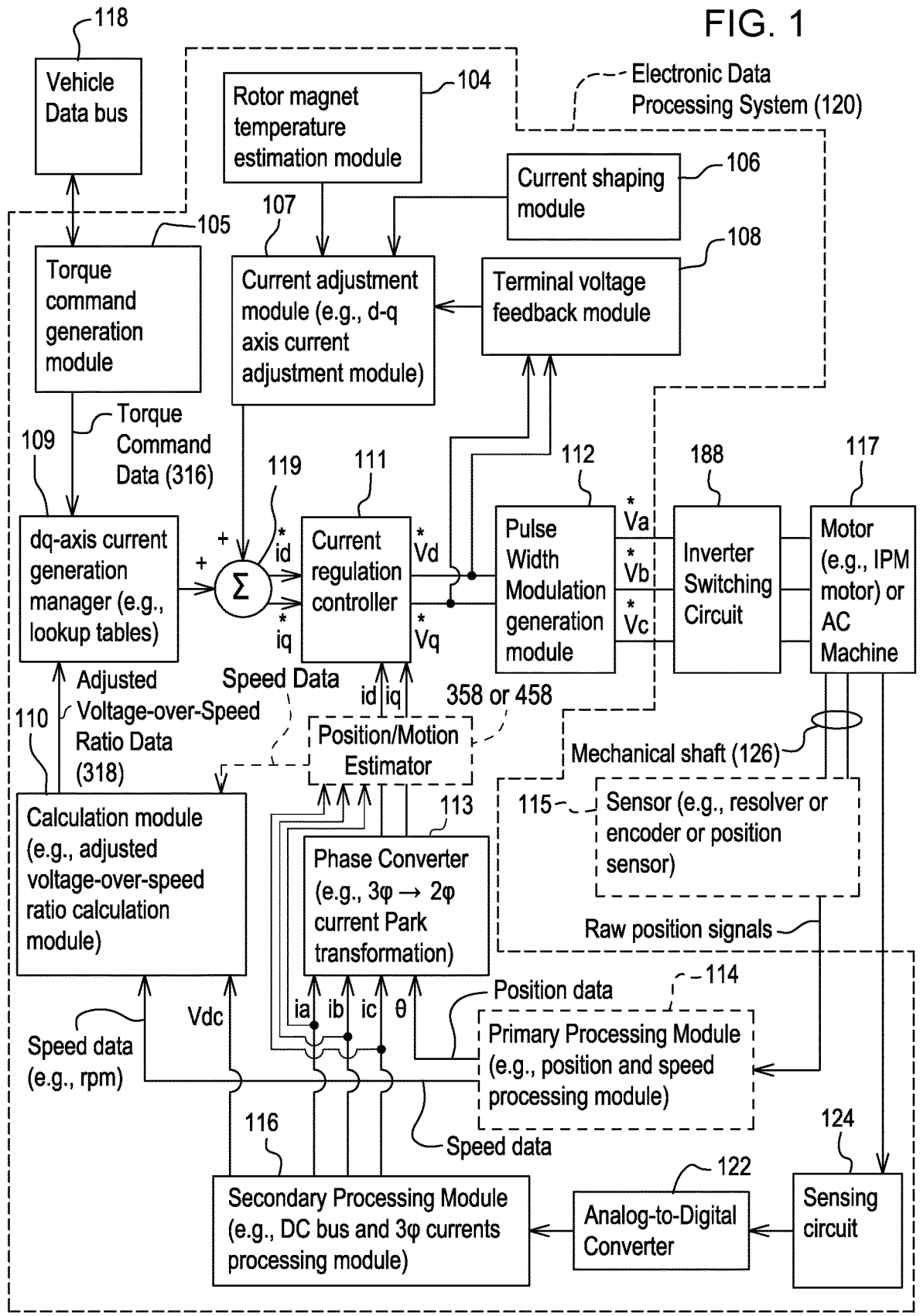
FIG. 1 is a block diagram of one embodiment of a system for controlling a permanent magnetic machine without a mechanical position sensor.

In accordance with one embodiment, FIG. 1 discloses system for controlling a motor 117 (e.g., an interior permanent magnet (IPM) motor) or another alternating current machine. In one embodiment, the system, aside from the motor 117, may be referred to as an inverter or a motor controller.

The system comprises electronic modules, software modules, or both. In one embodiment, the motor controller comprises an electronic data processing system 120 to support storing, processing or execution of software instructions of one or more software modules. The electronic data processing system 120 is indicated by the dashed lines in FIG. 1 and is shown in greater detail in FIG. 2.

The data processing system 120 is coupled to an inverter circuit 188. The inverter circuit 188 comprises a semiconductor drive circuit that drives or controls switching semiconductors (e.g., insulated gate bipolar transistors (IGBT) or other power transistors) to output control signals for the motor 117. In turn, the inverter circuit 188 is coupled to the motor 117. The motor 117 is associated with a sensor 115 (e.g., a position sensor, a resolver or encoder position sensor) that is associated with the motor shaft 126 or the rotor. The sensor 115 and the motor 117 are coupled to the data processing system 120 to provide feedback data (e.g., current feedback data, such as ia, ib, ic), raw position signals, among other possible feedback data or signals, for example. Other possible feedback data includes, but is not limited to, winding temperature readings, semiconductor temperature readings of the inverter circuit 188, three phase voltage data, or other thermal or performance information for the motor 117.

In one embodiment, the torque command generation module 105 is coupled to a d-q axis current generation manager 109 (e.g., d-q axis current generation look-up tables). D-q axis current refers to the direct axis current and the quadrature axis current as applicable in the context of vector-controlled alternating current machines, such as the motor 117. The output of the d-q axis current generation manager 109 and the output of a current adjustment module 107 (e.g., d-q axis current adjustment module 107) are fed to a summer 119. In turn, one or more outputs (e.g., direct axis current data (id*) and quadrature axis current data (iq*)) of the summer 119 are provided or coupled to a current regulation controller 111.

The current regulation controller 111 is capable of communicating with the pulse-width modulation (PWM) generation module 112 (e.g., space vector PWM generation module). The current regulation controller 111 receives respective d-q axis current commands (e.g., id* and iq*) and actual d-q axis currents (e.g., id and iq) and outputs corresponding d-q axis voltage commands (e.g., vd* and vq* commands) for input to the PWM generation module 112.

In one embodiment, the PWM generation module 112 converts the direct axis voltage and quadrature axis voltage data from two phase data representations into three phase representations (e.g., three phase voltage representations, such as va*, vb* and vc*) for control of the motor 117, for example. Outputs of the PWM generation module 112 are coupled to the inverter 188.

The inverter circuit 188 comprises power electronics, such as switching semiconductors to generate, modify and control pulse-width modulated signals or other alternating current signals (e.g., pulse, square wave, sinusoidal, or other waveforms) applied to the motor 117. The PWM generation module 112 provides inputs to a driver stage within the inverter circuit 188. An output stage of the inverter circuit 188 provides a pulse-width modulated signal or other alternating current signal for control of the motor. In one embodiment, the inverter 188 is powered by a direct current (DC) voltage bus.

The motor 117 is associated with a sensor 115 (e.g., a resolver, encoder, speed sensor, or another position sensor or sensors) that estimates at least one of an angular position of the motor shaft 126, a speed or velocity of the motor shaft 126, and a direction of rotation of the motor shaft 126. The sensor 115 may be mounted on or integral with the motor shaft 126. The output of the sensor 115 is capable of communication with the primary processing module 114 (e.g., position and speed processing module). In one embodiment, the sensor 115 may be coupled to an analog-to-digital converter (not shown) that converts analog position data or velocity data to digital position or velocity data, respectively. In other embodiments, the sensor 115 (e.g., digital position encoder) may provide a digital data output of position data or velocity data for the motor shaft 126 or rotor.

A first output (e.g., position data and speed data for the motor 117) of the primary processing module 114 is communicated to the phase converter 113 (e.g., three-phase to two-phase current (Park) transformation module) that converts respective three-phase digital representations of measured current into corresponding two-phase digital representations of measured current. A second output (e.g., speed data) of the primary processing module 114 is communicated to the calculation module 110 (e.g., adjusted voltage over speed ratio module).

An input of a sensing circuit 124 is coupled to terminals of the motor 117 for sensing at least the measured three-phase currents and a voltage level of the direct current (DC) bus (e.g., high voltage DC bus which may provide DC power to the inverter circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 (e.g., Direct current (DC) bus and three phase current processing module). For example, the sensing circuit 124 is associated with the motor 117 for measuring three phase currents (e.g., current applied to the windings of the motor 117, back EMF induced into the windings, or both).

Certain outputs of primary processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data from the secondary processing module 116 and position data from the sensor 115. The output of the phase converter 113 module is coupled to the current regulation controller 111.

Other outputs of the primary processing module 114 and the secondary processing module 116 may be coupled to inputs of the calculation module 110 (e.g., adjusted voltage over-speed ratio calculation module). For example, the primary processing module 114 may provide speed data (e.g., motor shaft 126 revolutions per minute), whereas the secondary processing module 116 may provide a measured level of direct current voltage (e.g., on the direct current (DC) bus of a vehicle). The direct current voltage level on the DC bus that supplies the inverter circuit 188 with electrical energy may fluctuate or vary because of various factors, including, but not limited to, ambient temperature, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 is connected as an intermediary between the secondary processing module 116 and the dq-axis current generation manager 109. The output of the calculation module 110 can adjust or impact current commands generated by the d-q axis current generation manager 109 to compensate for fluctuation or variation in direct current bus voltage, among other things.

The rotor magnet temperature estimation module 104, the current shaping module 106, and the terminal voltage feedback module 108 are coupled to or are capable of communicating with the dq-axis current adjustment module 107. In turn, the d-q axis current module 107 may communicate with the dq-axis current generation manager or the summer 119.

The rotor magnet temperature module 104 estimates or determines the temperature of the rotor permanent magnet or magnets. In one embodiment, the rotor magnet temperature estimation module 104 may estimate the temperature of the rotor magnets from internal control variables calculation, one or more sensors located on the stator, in thermal communication with the stator, or secured to the housing of the motor 117.

In one alternate embodiment, the rotor magnet temperature estimation module 104 may be replaced by or may estimate the temperature of the rotor magnets from one or more sensors located on the stator, in thermal communication with the stator, or secured to the housing of the motor 117.

In another alternative embodiment, the rotor magnet temperature estimation module 104 may be replaced with a temperature detector (e.g., a thermistor or infrared thermal detector coupled to a wireless transmitter) mounted on the rotor or the magnet, where the detector provides a signal (e.g., wireless signal) indicative of the temperature of the magnet or magnets.

In one embodiment, the method or system may operate in the following manner. The torque command generation module 105 receives an input control data message, such as a speed control data message, a voltage control data message, or a torque control data message, over a vehicle data bus 118. The torque command generation module 105 converts the received input control message into torque control command data 316.

The d-q axis current generation manager 109 selects or determines the direct axis current command data and the quadrature axis current command data associated with respective torque control command data and respective detected motor shaft 126 speed data. For example, the d-q axis current generation manager 109 selects or determines the direct axis current command, the quadrature axis current command by accessing one or more of the following: (1) a look-up table, database or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents.

In one embodiment, the optional sensor 115 on the motor 117 facilitates provision of the detected speed data for the motor shaft 126, where the primary processing module 114 may convert position data provided by the optional sensor 115 into speed data.

In an alternate embodiment, the estimator (358 or 458), which can also be referred to as position/motion estimator, can provide one or more of the following: rotor position data, rotor velocity data, and/or rotor acceleration data to the calculation module 110 or to other modules, such as the d-q axis current generation manager 109.

The current adjustment module 107 (e.g., d-q axis current adjustment module) provides current adjustment data to adjust the direct axis current command data and the quadrature axis current command data based on input data from the rotor magnet temperature estimation module 104 and the current shaping module 106.

The current shaping module 106 may determine a correction or preliminary adjustment of the quadrature axis (q-axis) current command and the direct axis (d-axis) current command based on one or more of the following factors: torque load on the motor 117 and speed of the motor 117, for example. The rotor magnet temperature estimation module 104 may generate a secondary adjustment of the q-axis current command and the d-axis current command based on an estimated change in rotor temperature, for example. The terminal voltage feedback module 108 may provide a third adjustment to d-axis and q-axis current based on controller voltage command versus voltage limit. The current adjustment module 107 may provide an aggregate current adjustment that considers one or more of the following adjustments: a preliminary adjustment, a secondary adjustment, and a third adjustment.

In one embodiment, the optional sensor 115 (e.g., shaft or rotor speed detector) may comprise one or more of the following: a direct current motor, an optical encoder, a magnetic field sensor (e.g., Hall Effect sensor), magneto-resistive sensor, and a resolver (e.g., a brushless resolver). The optional sensor 115 and optional primary processing module 114 are shown in dashed lines to indicate that they are optional and may be deleted in alternate embodiments. Further, the system may operate in a sensorless mode even if the optional sensor 115, or the primary processing module 114, or both are present, idle, disabled or in an inactive state.

In one configuration, the optional sensor 115 comprises a position sensor, where position data and associated time data are processed to determine speed or velocity data for the motor shaft 126. In another configuration, the optional sensor 115 comprises a speed sensor, or the combination of a speed sensor and an integrator to determine the position of the motor shaft.

In yet another configuration, the optional sensor 115 comprises an auxiliary, compact direct current generator that is coupled mechanically to the motor shaft 126 of the motor 117 to determine speed of the motor shaft 126, where the direct current generator produces an output voltage proportional to the rotational speed of the motor shaft 126. In still another configuration, the optional sensor 115 comprises an optical encoder with an optical source that transmits a signal toward a rotating object coupled to the shaft 126 and receives a reflected or diffracted signal at an optical detector, where the frequency of received signal pulses (e.g., square waves) may be proportional to a speed of the motor shaft 126. In an additional configuration, the optional sensor 115 comprises a resolver with a first winding and a second winding, where the first winding is fed with an alternating current, where the voltage induced in the second winding varies with the frequency of rotation of the rotor.

In one embodiment, the position/motion estimator (358 or 458) may be associated with the secondary processing module 116, such as integrated in the secondary processing module or receiving one or more current phase measurements (e.g., ia, ib, and ic) outputted by the secondary processing module 116. As illustrated, the position/motion estimator (358 or 458) is coupled between the phase converter 113 and the current regulation controller 111, such that certain calculations, estimations or determinations are can be made in a synchronous d-q axis reference frame, in a stationary reference frame, or both.

In accordance with one embodiment, a position/motion estimator (358 or 458) supports control of a permanent magnet machine by estimating one or more of the following: rotor position data, rotor speed or rotor velocity data, and rotor acceleration data (collectively position and motion data) based upon the current measurements of one or more phase outputs. The position/motion estimator (358 or 458) or a state evaluator may be stored in a data storage device 260 or implemented by software instructions provide to one or more electronic data processors 264.

In one embodiment, a state evaluator is incorporated within the position/motion estimator (358 or 458) or in communication with the rotor velocity or rotor speed estimated by the position/motion estimator (358 or 458). The state evaluator is adapted to determine whether the machine is operating within a first speed range or a second speed range, where the second speed range is greater than the first speed range. Further, in certain embodiments, the state evaluator determines whether the machine is operating within a transition speed range between or overlapping partially with the first speed range, the second speed range or both.

In the first speed range, the position/motion estimator may estimator rotor position and motion data based on Volts per frequency (e.g., Volts per Hertz), or other open-loop control techniques in accordance with a second mode. Alternately, in the first speed range, the position/motion estimator could control current or voltage injection into the windings to facilitate back electromotive force estimations at lower rotor speeds. In the second speed range, the position/motion estimator may estimate rotor position and motion data based on the back electromotive force (EMF) in accordance with a first mode that is compatible with precise field-oriented control (FOC, such as space-vector-pulse-width-modulation (SVPWM)) of the motor torque, position and motion.

A sensor (e.g., a sensing circuit 124) is configured to sense current, of one or more output phases of an inverter. In one embodiment, the sensor (e.g., sensing circuit 124) comprises a current sensor or voltage sensor combined with a voltage-to-current converter (e.g., unity gain voltage-to-current amplifier). The sensed current is associated with or indicative of back electromotive force of the machine. As illustrated, an analog-to-digital converter 122 converts one or more measured or observed current phase outputs into digital signals for processing by one or more electronic data processors.

In the digital domain, a converter or electronic data processor can convert the digital sensed current into current vectors associated with a stationary reference frame. The converter may receive three phase current inputs or inputs in the d-q axis reference frame for the conversion into the stationary reference frame.

In the position/motion estimator or by the electronic data processor, the digital converted, sensed current vectors are used in a current model to estimate back EMF vectors. A vector tracking observer 362 or the electronic data processor is adapted to mix (e.g., heterodyne or apply a vector cross product) the back-EMF vectors and to apply the mixed (e.g., heterodyned) back EMF vectors to a preliminary inertial model. A secondary observer 364 or the data processor is adapted to apply the output of the preliminary inertial model to a secondary inertial model in the second speed range to estimate position or motion data (e.g., smoothed position of the rotor of the machine versus time, velocity, acceleration).

As indicated above, a state evaluator is adapted to determine whether the machine is operating within a first speed range or a second speed range, where the second speed range is greater than the first speed range.

In the second speed range of the rotor, back-EMF amplitude in a permanent magnet synchronous machine (PMSM) or motor is proportional to the rotor speed; hence, there is a constraint on the low speed limit in which back-EMF tracking can estimate an accurate rotor position. A back-EMF tracking module can estimate the rotor position in a second speed range (e.g., from medium to high speed operation).

Volts per frequency control mode, such as V/Hz (Volts/Hertz) control mode, can be used to control the rotor velocity machine within a first speed range, such as at startup of the motor from zero speed to a first speed threshold. In practice, the first speed threshold may be set to an upper limit of first speed range or lower speed range.

Field-oriented control mode (e.g., space-vector-pulse-width-modulation (SVPWM) control mode) can be used to control the rotor velocity machine within a second range that is greater in rotor velocity that the first range. The second range has a second speed threshold that may be set to a lower limit of the second speed range. The second speed range may encompass a medium-speed range or a high-speed range. V/Hz does not require position and speed feedback to operate and is compatible with control of the permanent magnet machines or other non-reluctance machines. However, V/Hz control is limited because it is an open-loop control method.

In an alternate embodiment, V/Hz mode can be used to control the rotor velocity of the machine when the back-electromotive feedback speed (BMEF) is not available to has quality (e.g., observed signal-to-noise ratio) that falls below a quality threshold (e.g., minimum signal to noise ratio).

V/Hz control avoids variation in the magnetic field strength by varying the applied voltage with a corresponding frequency to maintain a V/Hz ratio that is generally constant or within a certain range. For example, for each target rotor velocity, the V/Hz control can be represented as a quadratic function of rotor velocity and torque. In some applications, the torque at startup is associated with maximum loading capability.

For the first speed range of the rotor or in accordance with the first mode, the position/motion estimator can estimate the position and motion of the rotor in accordance with the following V/Hz control equations:

$$V_q = \omega^* \lambda_m; V_d = 0,$$

where $V_q$ is the quadrature-axis voltage, $V_d$ is the direct axis voltage, $\omega$ is electrical rotor speed in radians/second, $\lambda_m$ is the flux linkage of the permanent magnets of the machine.

The electric machine d-q voltage equations can be written as:

$$V_q = I_q^* r_s + \omega L_s I_d + \omega \lambda_m,$$

$$V_d = I_d^* r_s - \omega L_s I_q, \text{ and}$$

$$V_d^2 + V_q^2 = (\omega^2 L_s^2 + R^2) i_d^2 + 2\omega^2 \lambda_{pm} L_s i_d + [(\omega^2 L_s^2 + R^2) i_q^2 + 2R\omega \lambda_{pm} i_q] = 0$$

where $V_q$ is the quadrature-axis voltage, $I_q$ is the quadrature-axis current, $V_d$ is the direct axis voltage, $I_d$ is the direct-axis current, R or $r_s$ is the resistance of a phase of the stator windings, $\omega$ is electrical rotor speed (e.g., in radians/second), $L_s$ is the inductance of the stator, $\lambda_m$ or $\lambda_{pm}$ is the flux linkage of the permanent magnets in the electric machine. By definition, $V_q$ has a 90-degree phase difference from $V_d$, which implies that $V_g$ can be mathematically expressed relative to $V_d$ in imaginary format by $V_g = jV_g$, where $V_d$ is a real number and j is the standard imaginary operator where j squared equals −1.

The equation can be limited to real solutions and re-written as a quadratic function as follows:

$$f(\omega, i_q) = (\omega^2 L_s^2 + R^2) i_q^2 + 2R\omega \lambda_{pm} i_q - \frac{\omega^4 \lambda_{pm}^2 L_s^2}{(\omega^2 L_s^2 + R^2)} \leq 0,$$

where $\omega$ is electrical rotor speed (e.g., in radians/second), $L_s$ is the machine inductance, R is the resistance of one phase of the stator windings, $i_q$ is the quadrature-axis current, $\lambda_{pm}$ is the flux linkage of the permanent magnets of the electrical machine.

In terms of torque, or replacing quadrature-axis current ($I_g$) with commanded torque ($T_e$) in the equation above:

$$f(\omega, T_e) = \frac{(\omega^2 L_s^2 + R^2)}{k_t^2} T_e^2 + \frac{2R\omega \lambda_{pm}}{k_t} T_e - \frac{\omega^4 \lambda_{pm}^2 L_s^2}{(\omega^2 L_s^2 + R^2)} \leq 0,$$

where $k_t$ is sampling time interval.

In the V/Hz control mode, for a fixed speed operating point and known load state, θdiff, Vd, Vq can be calculated with a certain corresponding K. If the load state is below a load threshold, then the θdiff is approximately zero, the transition between V/Hz and field oriented control (FOC), such as space vector pulse-width modulation control, is simplified for aligning shaft position for the transition. The transition between the V/Hz control and FOC may be regarded as a shaft-alignment state. FOC can use the direct-axis current vector to define magnetic flux of the motor and the quadrature-axis current vector to define torque. The V/Hz control module is configured to cooperate with the FOC control module to achieve a smooth transition between V/Hz control and FOC.

Volts per frequency (V/F) control mode, such V/Hz control mode, or will be used to spin up the machine (e.g., motor 117) from zero speed and once the rotor speed reaches a set threshold it will automatically transition to/from the position sensorless field oriented control. The V/F control mode controls the rotor speed of a rotor based on a constant voltage/frequency ratio or a range of voltage/frequency ratio to maintain efficient operation of the motor 117.

Figure 2:
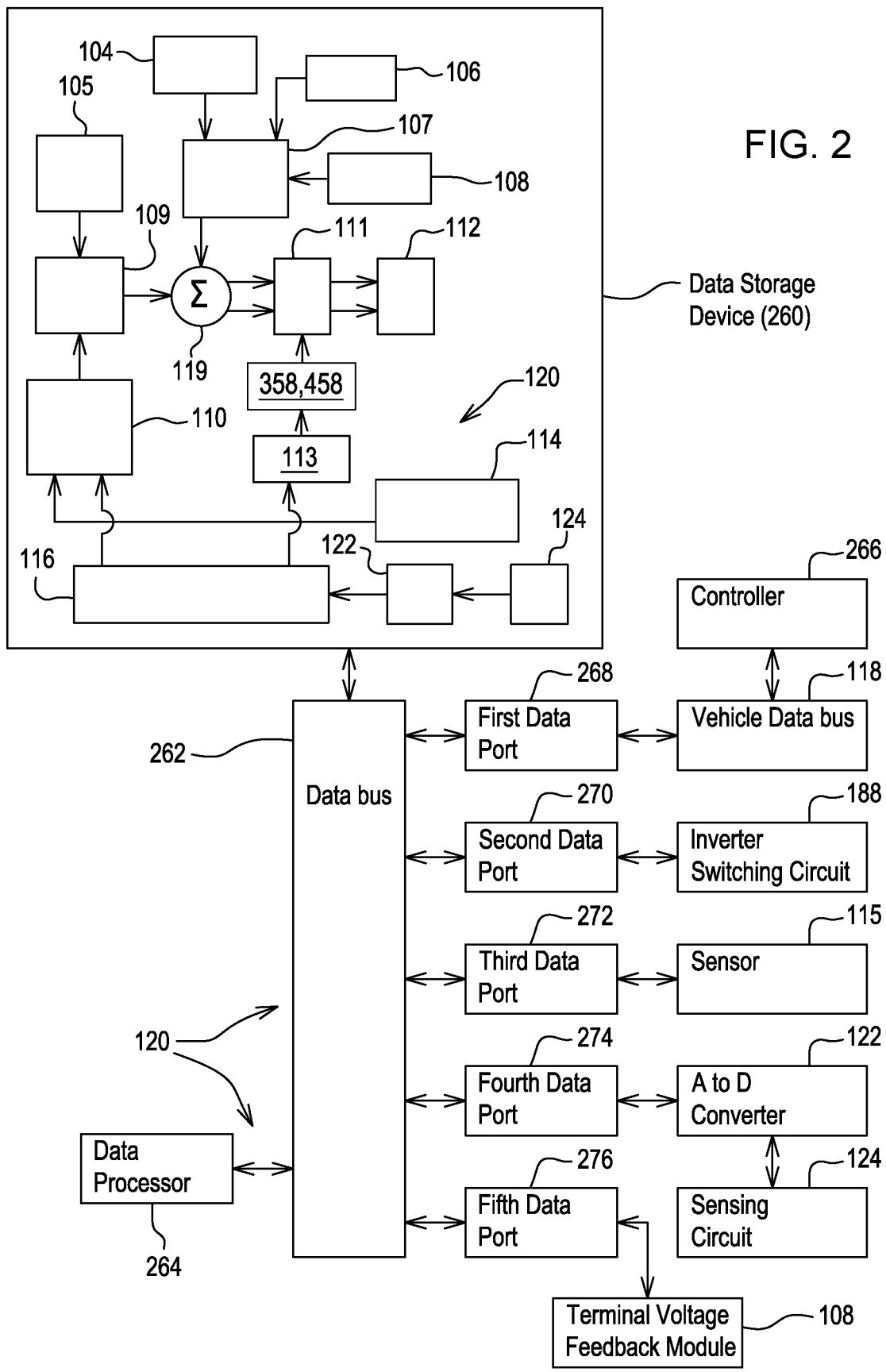
FIG. 2 is one possible illustrative example a block diagram of a system for controlling a permanent magnetic machine without a mechanical position sensor, which is consistent with FIG. 1.

In FIG. 2, the electronic data processing system 120 comprises an electronic data processor 264, a data bus 262, a data storage device 260, and one or more data ports (268, 270, 272, 274 and 276). The data processor 264, the data storage device 260 and one or more data ports are coupled to the data bus 262 to support communications of data between or among the data processor 264, the data storage device 260 and one or more data ports.

In one embodiment, the data processor 264 may comprise one or more of the following electronic components: an electronic data processor, a microprocessor, a microcontroller, a programmable logic array, a field programmable gate array (FPGA), a logic circuit, an arithmetic logic unit, an application specific integrated circuit, a digital signal processor (DSP), a proportional-integral-derivative (PID) controller, or another data processing device. The above electronic components may be interconnected via one or more data buses, parallel data buses, serial data buses, or any combination of parallel and serial data buses, for example.

The data storage device 260 may comprise any magnetic, electronic, or optical device for storing data. For example, the data storage device 260 may comprise an electronic data storage device, an electronic memory, non-volatile electronic random-access memory, one or more electronic data registers, data latches, a magnetic disc drive, a hard disc drive, an optical disc drive, or the like.

As shown in FIG. 2, the data ports comprise a first data port 268, a second data port 270, a third data port 272, a fourth data port 274 and a fifth data port 276, although any suitable number of data ports may be used. Each data port may comprise a transceiver and buffer memory, for example. In one embodiment, each data port may comprise any serial or parallel input/output port.

In one embodiment as illustrated in FIG. 2, the first data port 268 is coupled to the vehicle data bus 118. In turn, the vehicle data bus 118 is coupled to the controller 266. In one configuration, the second data port 270 may be coupled to the inverter circuit 188; the third data port 272 may be coupled to the sensor 115; the fourth data port 274 may be coupled to the analog-to-digital converter 122; and the fifth data port 276 may be coupled to the terminal voltage feedback module 108. The analog-to-digital converter 122 is coupled to the sensing circuit 124.

In one embodiment of the data processing system 120, the torque command generation module 105 is associated with or supported by the first data port 268 of the electronic data processing system 120. The first data port 268 may be coupled to a vehicle data bus 118, such as a controller area network (CAN) data bus. The vehicle data bus 118 may provide data bus messages with torque commands to the torque command generation module 105 via the first data port 268. The operator of a vehicle may generate the torque commands via a user interface, such as a throttle, a pedal, a controller 266, or other control device.

In certain embodiments, the sensor 115 and the primary processing module 114 may be associated with or supported by a third data port 272 of the data processing system 120.

Figures 3A, 3B:
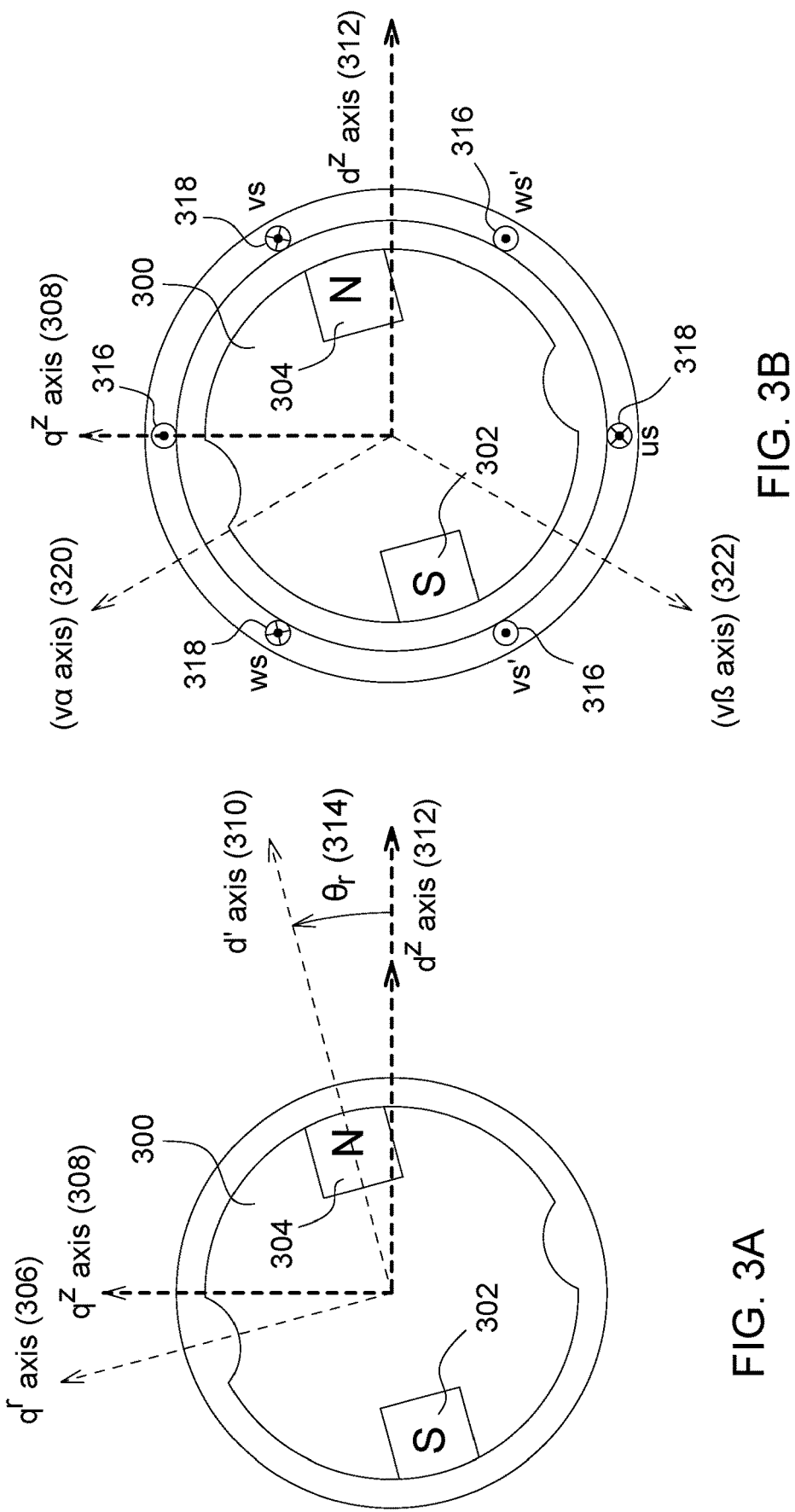
FIG. 3A shows a d-q coordinate system for a permanent magnet synchronous machine (PMSM) where the rotor d-q reference frame is illustrated with respect to the stator d-q reference frame
FIG. 3B shows the relationship between the stator reference frame and the stationary reference frame.

FIG. 3A shows a d-q coordinate system for a permanent magnet synchronous machine (PMSM) where the rotor d-q reference frame is illustrated with respect to the stator d-q reference frame. FIG. 3A illustrates a rotor 300 with two or more magnets (302, 304) secured to the rotor 300. A rotor direct-axis 310 (e.g., $d^r$ axis or d' axis) rotates with respect to the corresponding stator direct axis 312 ($d^z$ axis), where the rotor position of the rotor direct-axis 310 with respect to the stator direct axis 312 can be measured by the angular rotor position, $\theta_r$, 314. The rotor quadrature-axis 306 ($q^r$ axis) is generally orthogonal to the rotor direct axis 310; hence has the same angular rotor position, $\theta_r$, 314 with respect to the stator-quadrature axis 308 ($q^z$ axis). Likewise, the stator quadrature-axis 308 ($q^z$) is generally orthogonal to the stator direct axis 312 ($d^z$ axis).

FIG. 3B shows the relationship between the stator reference frame and the stationary reference frame. The rotating rotor d-q reference frame of FIG. 3A is omitted from FIG. 3B to simplify FIG. 3B for improved clarity. Like reference numbers in FIG. 3A and FIG. 3B indicate like elements or features.

FIG. 3A is similar to FIG. 3B except FIG. 3B further includes stator conductors (316 and 318) associated with stator windings. At the terminals of the electrical machine or motor 117, stator conductors (316, 318) have electromagnetic fields that are associated with three phases ($w_s$, $v_s$, $u_s$ and derivative phases $w_s'$, $v_s'$, $u_s'$) of alternating electrical current exiting and plane of drawing of FIG. 3B (e.g., indicated by the dots) or entering the plane of the drawing of FIG. 3B, where the X indicates electrical current flow into the plane of page (e.g. indicated by the cross or letter X). Here, in FIG. 3B, the two-axis stationary frame is expresses as $v_s$ axis 320 (e.g., $V_\alpha$ axis) and $w_s$ axis 322 ($v_\beta$ axis) which is illustrated with reference to the stator d-q reference frame (312, 308) in FIG. 3B.

In one example, the estimator, an Inverse Parks transform or the back-EMF module supports converting from a rotor reference frame to a stationary reference frame, which can be accomplished by various equations. For example, scalar equations for a PMSM in rotor reference frame are given by:

$$v_{ds}^r = r_s i_{ds}^r + p\lambda_{ds}^r - \omega_r \lambda_{qs}^r$$

$$v_{qs}^r = r_s i_{qs}^r + p\lambda_{qs}^r - \omega_r \lambda_{qs}^r$$

where, $v_{ds}^r$ is the direct-axis voltage in the rotor reference frame, $v_{qs}^r$ is the quadrature-axis voltage in the rotor reference frame, $r_s$ is the stator resistance for any phase, $i_{ds}^r$ is the direct-axis current in the rotor reference frame, and $id_{qs}^r$ is the quadrature-axis current in the rotor reference frame, p means a change per unit time or d/dt, $\omega_r$ is the physical rotational speed of the rotor, $\lambda_{ds}^r$ is the direct-axis flux linkage in the rotor reference frame, and $\lambda_{qs}^r$ is the quadrature-axis flux linkage in the rotor reference frame.

$$\lambda_{ds}^r = L_d i_{ds}^r + \lambda_{pm}$$

$$\lambda_{qs}^r = L_q i_{qs}^r$$

where $\lambda_{ds}^r$ is the direct-axis flux linkage in the rotor reference frame, $\lambda_{qs}^r$ is the quadrature-axis flux linkage in the rotor reference frame, $L_d$ is the direct-axis inductance, $L_q$ is the quadrature-axis inductance, $i_{ds}^r$ is the direct-axis current in the rotor reference frame, $i_{qs}^r$ is the quadrature-axis current in the rotor reference frame and $\lambda_{PM}$ is the flux linkage of the permanent magnets in the electric machine.

The machine equations can be modeled using the d-q currents as state variables in the rotor reference frame.

$$v_{dqs}^r = \left\{ \begin{array}{c} v_{ds}^r \\ v_{qs}^r \end{array} \right\} = \left[ \begin{array}{cc} r_s + pL_d & -\omega_r L_q \\ \omega_r L_d & r_s + pL_q \end{array} \right] \left\{ \begin{array}{c} i_{ds}^r \\ i_{qs}^r \end{array} \right\} + \left[ \begin{array}{c} 0 \\ e \end{array} \right]$$

where:

$e = \omega_r \lambda_{pm}$, where e is the back electromotive force term.

When the equation above is transformed into the stationary d-q reference frame, the rotor position appears in the back-emf term.

$$\left\{ \begin{array}{c} v_{ds}^s \\ v_{qs}^s \end{array} \right\} = \left[ \begin{array}{cc} r_s + pL_d' & pL_{dq}' \\ pL_{dq}' & r_s + pL_q' \end{array} \right] \left\{ \begin{array}{c} i_{ds}^s \\ i_{qs}^s \end{array} \right\} + \left\{ \begin{array}{c} e_d^s \\ e_q^s \end{array} \right\}$$

where, $v_{ds}^s$ is the direct-axis voltage in the stationary d-q reference frame, $v_{qs}^s$ is the quadrature-axis voltage in the stationary d-q reference frame, $r_s$ is the stator resistance for any phase, $i_{ds}^s$ is the direct-axis current in the stationary d-q reference frame, and $id_{qs}^s$ is the quadrature-axis current in the stationary d-q reference frame, p means a change per unit time or d/dt, $L_d'$ is the direct-axis inductance, $L_q'$ is the quadrature-axis inductance, and $L_{dq}'$ is an inductance parameter derived from the direct-axis and the quadrature axis inductances as indicated below; where:

$$\left\{ \begin{array}{c} e_d^s \\ e_q^s \end{array} \right\} = e \left[ \begin{array}{c} -\sin(\theta_r) \\ \cos(\theta_r) \end{array} \right]$$

$e_d^s$ is the direct-axis back-EMF in the stationary reference frame, $e_q^s$ is the quadrature-axis back-EMF in the stationary reference frame; and $$L_d' = L_0 + L_1 \cos(2\theta_r)$$

$$L_q' = L_0 - L_1 \cos(2\theta_r)$$

$$L_{dq}' = L_1 \sin(2\theta_r)$$

$$L_0 = \frac{L_d + L_q}{2}$$

$$L_1 = \frac{L_d - L_q}{2}$$

For synchronous permanent magnet (SPM) machines, because the d-q inductance are same, $L_d' = L_d = L_q$ and $L_{dq}' = 0$. Because the rotor position ($\theta_r$) appears in the back-emf terms, the estimator, the back-EMF module or data processor can use the above equations to estimate rotor position in conjunction with back EMF. Accordingly, the estimator or back-EMF module can comprise the above SPM model to derive the stationary frame current observer that estimates the back-EMF as a state filter output; hence, provides initial estimates of rotor position.

Figure 4:
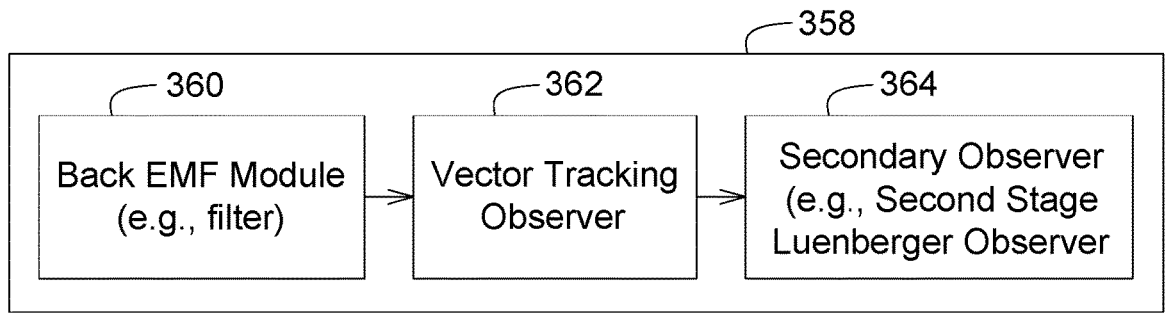
FIG. 4 illustrates a block diagram of one embodiment of a position estimator with a vector tracking observer and a secondary observer.

FIG. 4 illustrates a block diagram of one embodiment of a position estimator (358 or 458) with a vector tracking observer 362 and a secondary observer 364. The estimator (358 or 458) (358 or 458) may incorporate or communicate with the back-EMF module 360 or a reference frame converter (e.g., an Inverse Park Transform) to convert between a rotating rotor d-q reference frame and a two-axis stationary reference frame (e.g., defined by $V_\alpha$ and $V_\beta$ axes). Alternately, the estimator (358 or 458) or electronic data processor 264 can derive the two-axis stationary reference frame directly from two or three phase voltage measurements or current measurements at the input to the machine (e.g., motor 117).

In one embodiment, the position/motion estimator (358 or 458) comprises a back-EMF module 360 coupled to or in communication with a vector-tracking observer. In turn, the vector tracking observer 362 is coupled to or communicates with a secondary observer 364. An estimator (358 or 458) or back-EMF module 360 is configured to estimate back-EMF vectors from the converted current vectors (e.g., via a current model, equations or a look-up tables). A vector tracking observer 362, a vector cross product module 366, or the electronic data processor 264 is adapted to mix (e.g., heterodyne or apply a vector cross product) the back-EMF vectors and to apply the mixed (e.g., heterodyned) back-EMF vectors to a preliminary inertial model managed by the inertial model module 370.

A secondary observer 364 or the data processor 264 is operable to apply the output of the preliminary inertial model module 370 to a secondary inertial model of a secondary inertial model module 374 in the second speed range to estimate position or motion data for the rotor (e.g., a smoothed position of the rotor of the machine versus time, rotor velocity, or rotor acceleration).

In the estimator (358 or 458) or in the back-EMF module 360, back-EMF tracking works on the principle that the back-EMF of the machine (e.g., motor 117) aligns with the q-axis in the synchronous d-q axis reference frame. Hence, if the back-EMF magnitude and phase are known in the stationary reference frame, then the angular position is also known in the synchronous d-q frame. The back-EMF vector can be estimated using a state filter based stationary frame current observer. Synchronous permanent magnet (SPM) machine equations in the stationary frame are shown below:

$$v_{\alpha s} = i_{\alpha s} r_s + p i_{\alpha s} L_s - \Omega_e \lambda_{pm} \sin(\theta_r), \text{ and}$$

$$v_{\beta s} = i_{\beta s} r_s + p i_{\beta s} L_s + \Omega_e \lambda_{pm} \cos(\theta_r),$$

where $\theta_r$ is the angular rotor position, $v_{\alpha s}$ is the voltage vector for the α component in the stationary reference frame, $v_{\beta s}$ is the voltage vector for the β component in the stationary reference frame, $i_{\alpha s}$ is the current vector for the α component in the stationary reference frame, $i_{\beta s}$ is the current vector for the β component in the stationary reference frame, $r_s$ is the stator resistance for one phase of the stator windings, p means a change per unit time or d/dt, $L_s$ is the stator inductance for one phase of windings λpm is the flux linkage of the permanent magnets for the machine, and $\Omega_e$ is an back-electromotive force vector.

The above two equations can be represented with complex vectors in a single equation as follows:

$$V_{\alpha\beta} = I_{\alpha\beta} r_s + p I_{\alpha\beta} L_s + E_{\alpha\beta}$$

where, $$E_\alpha = -\Omega_e \lambda_{pm} \sin(\theta_r) \text{ and}$$

$$E_\beta = \Omega_e \lambda_{pm} \cos(\theta_r),$$

where $\theta_r$ is the angular rotor position, $V_{\alpha\beta}$ is the complex voltage vector for the α and β components in the stationary reference frame, $I_{\alpha\beta}$ is the complex current vector for the α and β components in the stationary reference frame, $r_s$ is the stator resistance for one phase of the stator windings, p means a change per unit time or d/dt, $L_s$ is the stator inductance for one phase of windings, λpm is the flux linkage of the permanent magnets for the machine, and $E_{\alpha\beta}$ is a complex back-electromotive force vector for the α and β components and $\Omega_e$ is a back-electromotive force vector (e.g., associated with the α or β modeled phase of the stationary reference frame).

A forward Euler approximation is applied to the above equation to determine the following discrete time model:

$$pI_{\alpha\beta}[k] = \frac{I_{\alpha\beta}[k+1] - I_{\alpha\beta}[k]}{T}$$

where T represents a sampling time period, k is a discrete time interval within the sampling time period and k+1 is a next interval of discrete time interval k within the sampling time period.

In the above equation, the discrete time approximation $pI_{\alpha\beta}[k]$ can be substituted in a continuous time model, such that the following discrete-time simplification results:

$$V_{\alpha\beta}[k] = I_{\alpha\beta}[k]r_s + L_s \frac{I_{\alpha\beta}[k+1] - I_{\alpha\beta}[k]}{T} + E_{\alpha\beta}[k]$$

The foregoing equation is simplified below:

$$V_{\alpha\beta}[k] = I_{\alpha\beta}[k] * \left(r_s - \frac{L_s}{T}\right) + I_{\alpha\beta}[k+1] * \frac{L_s}{T} + E_{\alpha\beta}[k]$$

In one embodiment, the back-EMF module 360 uses the above equation to implement, define or form a stationary frame state filter for back-EMF estimation based on stationary frame current observer in accordance with a discrete time model. The complex vector is decomposed into separate models for α and β scalar components. Because the back-EMF is not modeled, it is inherently estimated by the observer controller 368 within the bandwidth of the observer controller 368.

In one embodiment, in module 116 or position/motion estimator (358 or 458) 358, or both, the measured three phase currents are transformed into α and β components and is used as the tracking signal for the stationary frame current observer. The observer controller (368, 372) in this case is only a proportional gain. The observer controller (368, 372) provides the convergence dynamics for the estimated current in the presence of disturbance and parameter estimation errors.

Figure 5:
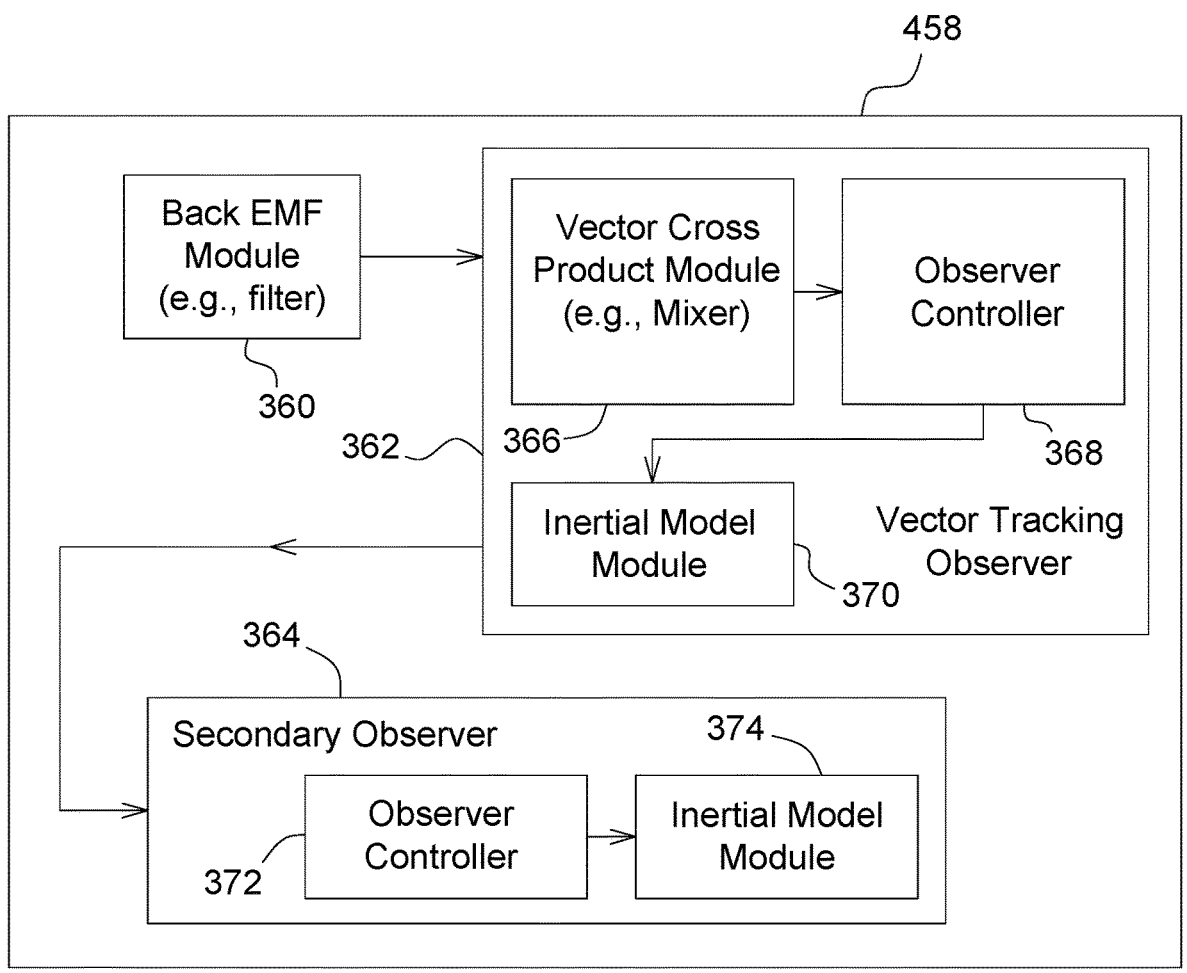
FIG. 5 illustrates a block diagram of another embodiment of a position estimator featuring a heterodyning module.

FIG. 5 illustrates a block diagram of another embodiment of a position estimator (358 or 458) featuring a vector cross product module 366, such as a mixer, a mixing module or a heterodyning module. The configuration of the position/motion estimator (358 or 458) of FIG. 5 is similar to the configuration of the position/motion estimator (358 or 458) of FIG. 4, except FIG. 5 shows the vector tracking observer 362 and the secondary observer 364 in more detail. Like features, modules or elements in FIG. 4 and FIG. 5 are indicated by like reference numbers.

Figure 6:
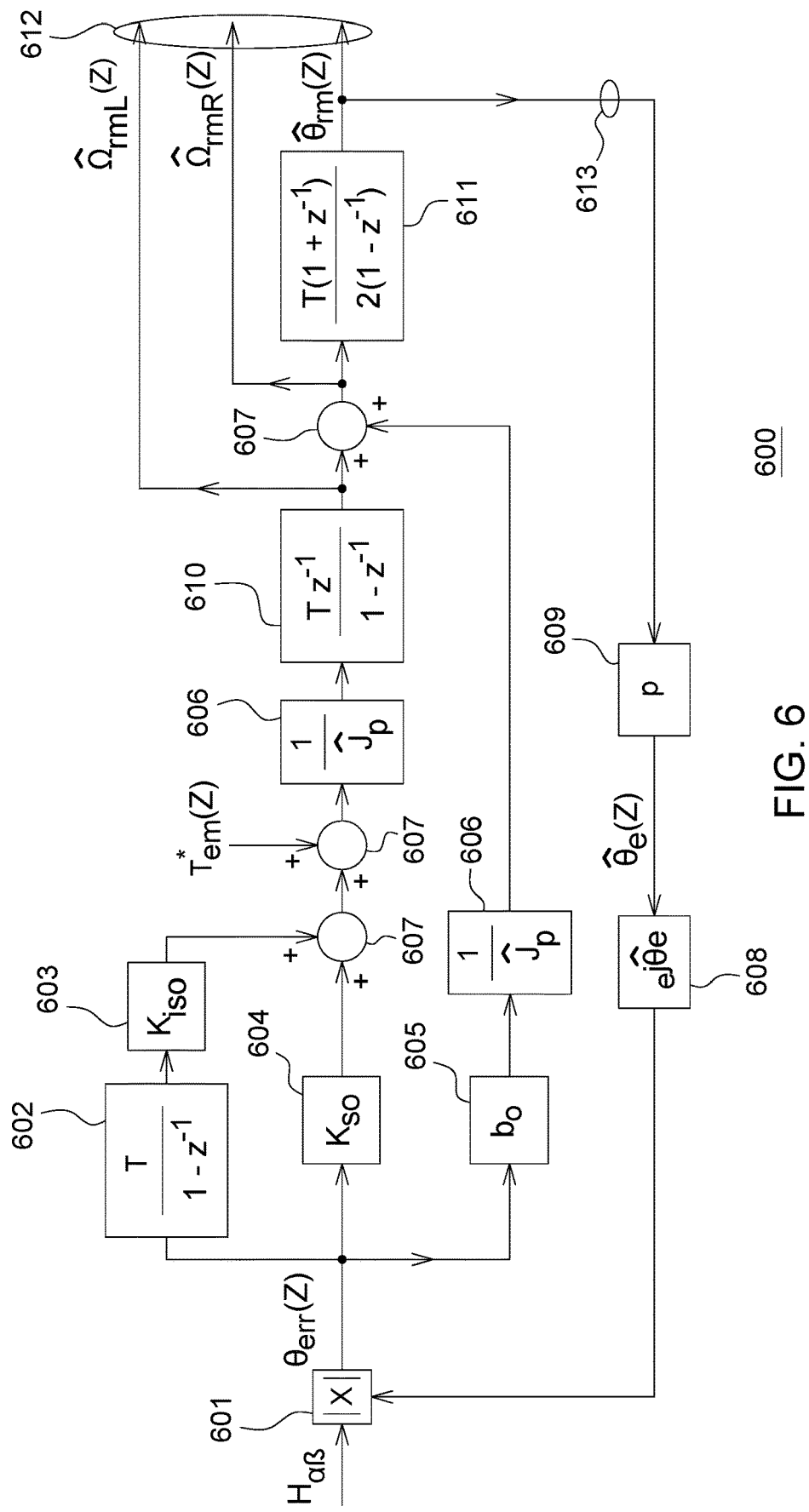
FIG. 6 illustrates a block diagram of a discrete time model of a representative vector tracking observer.

In FIG. 4, FIG. 5 and FIG. 6, the input to the vector tracking observer 362 can be modeled as shown below to yield a rotating position vector as output:

$$H_{\alpha\beta} = e^{j\theta_e} = \cos(\theta_e) + j\sin(\theta_e),$$

where $H_{\alpha\beta}$ is a filtering response vector for the α and β components in the stationary reference frame, $e^{j\theta_e}$ is the composite real and imaginary filter response that is function of $\theta_e$, and $\theta_e$ is the angular rotor position derived from back-EMF response.

The estimated output from the observer can be modeled as shown below:

$$H^{\wedge}_{\alpha\beta} = e^{j\hat{\theta}e} = \cos(\hat{\theta}e) + j\sin(\hat{\theta}e),$$

where $\hat{\theta}e$ is the average rotor position averaged over a sampling time period and derived from back-EMF response.

The vector-cross product module 366 or the mixer performs a vector cross product or vector dot product (scalar product) between the input to the vector tracking observer 362 and the estimated output from the observer vector tracking observer 362. The vector cross product can be mathematically represented as shown below:

$\sin(\theta_e)\cos(\hat{\theta}c) - \cos(\theta_e)\sin(\hat{\theta}c)$ which using trigonometric identity reduces to $\sin(\theta_e - \hat{\theta}c)$. Because $\theta_e$ and $\hat{\theta}e$ will track, $\theta_{err} = (\theta_e - \hat{\theta}e)$ will be tolerably small or insignificant for precise position estimates from back-EMF. In general, for small angles θ, sin(θ)=θ. Hence, the output after vector cross product of the observer input and estimated output of the observer, will be the angular error $\theta_{err}$ which is passed to the standard or modified Luenberger observer.

As illustrated in FIG. 5, The vector tracking observer 362 which consists of the inertial model, observer controller 368 and command feedforward estimates the acceleration, instantaneous and average speeds, and rotor position. The instantaneous speed is fed to a secondary observer 364, such as a second stage Luenberger observer or modified Luenberger observer, for further filtering (lower bandwidth) of speed that could be used for closed loop speed control. A disturbance estimate from the secondary observer 364 is used to perform disturbance input decoupling to improve the dynamic stiffness of the closed loop motion controller A standard Luenberger Observer needs position as the outer state signal to estimate the inner states. The output of the back-EMF state filter could be directly used to determine the rotor position by using the arc-tangent function. The arc-tangent is a non-linear function and is sensitive to noise, hence the estimated position will be noisy. The estimator (358 or 458) avoids the arc-tangent operation for estimating rotor position (e.g., estimates illustrated in FIG. 7A) by using the vector tracking observer 362, which further behaves like a zero-lag filter thus able to achieve cleaner position estimates and a lower accurate minimum speed for the second range.

Within the position estimator (358 or 458), the raw estimated rotor position will be fed to a heterodyning Luenberger observer module which will estimate the rotor speed and position with zero lead/lag. The estimated position is used for field oriented control. A second stage Luenberger observer will be used to filter the noise from the speed estimated from the first stage, again with zero lead/lag. The filtered estimated speed is used for closed loop speed control. The estimated shaft torque will be used to perform disturbance input decoupling to improve the dynamic stiffness of the closed loop system.

Figure 7A:
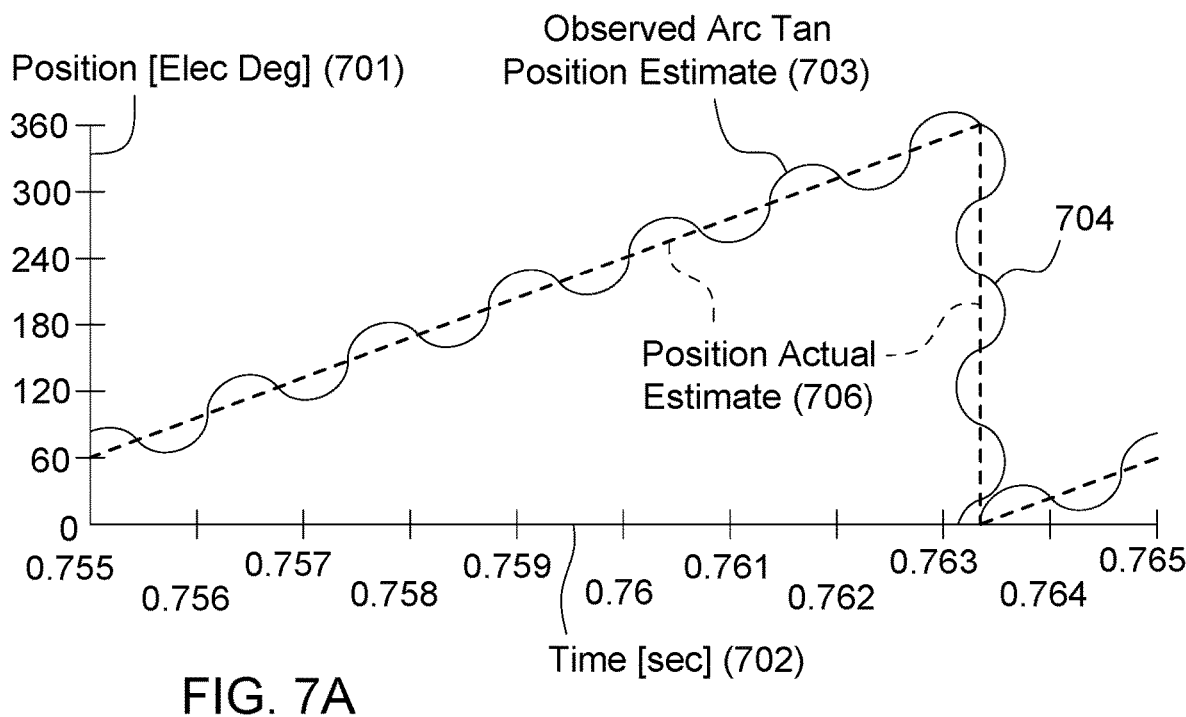
FIG. 7A illustrates a typical prior art arc tangent position estimation expressed a noisy saw-tooth waveform.
Figure 7B:
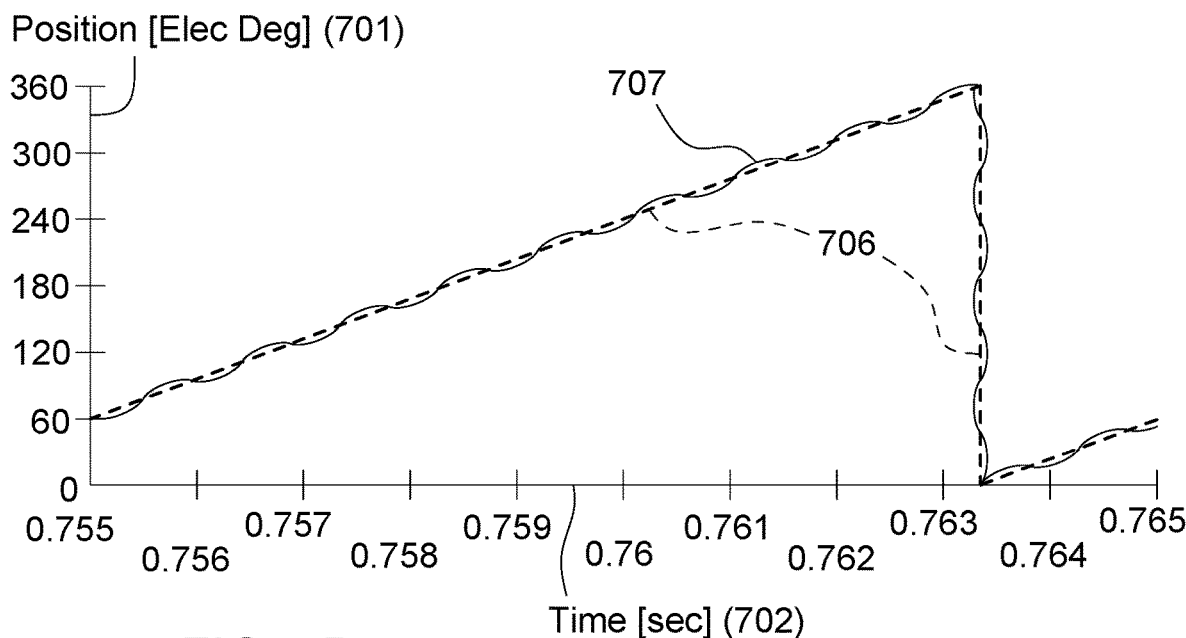
FIG. 7B illustrates a heterodyning observer position estimation in accordance with this disclosure.

The vector cross product module 366 (e.g., heterodyning position tracking observer) can outperform the accuracy of a traditional, cascaded Luenberger observer with arc-tangent position determination (i.e., back EMF sliding mode observer followed by arc tangent determinations from EMF observer output), as is illustrated by comparing the rotor position estimates of FIG. 7A to FIG. 7B.

FIG. 6 illustrates an illustrative discrete time model 600 for a vector tracking observer 362. The vector tracking of the back-EMF vectors facilitates tracking rotor position signals which output rotating vectors of two orthogonal signals. The block diagram of the vector tracking is shown in FIG. 6.

In block 601, a cross product module or mixer takes the vector cross product of the vector $H_{\alpha\beta}$ and feedback 613 from output 612 of the vector tracking observer 362 or the secondary observer 372 to produce an angular error $\theta_{err}$. As illustrated, the feedback 613 is processed by amplifying, gain or attenuation in block 609 and averaging of rotor angle over one or more time periods in block 608. Block 603 represents a gain parameter $K_{iso}$; block 604 represents a gain parameter $K_{SO}$; block 605 represents a gain parameter $b_o$. Block 606 represents a machine parameter value and $T^*_{em(Z)}$ represents commanded torque for the machine or motor 117. Here, the discrete time model is expressed as various Z-domain functions in blocks 602, 610, and 611 where Z represents a complex number that can indicate a frequency-domain response and where T represents a time period (e.g., related to the sampling frequency of current or voltage signals at the phase terminals of the machine or motor 117). The adding function is represented in circular blocks 607. The outputs 612 relate to time-averaged back-electromotive force vectors ($\widehat{\Omega_{rmL(Z)}}$ and $\widehat{\Omega_{rmR(Z)}}$) (e.g., associated with the two-axis stationary reference frame) and the time-averaged rotor angular position ($\widehat{\theta_{rm(Z)}}$).

FIG. 7A illustrates a typical prior art arc tangent position estimation expressed a noisy saw-tooth waveform. In FIG. 7A, the vertical axis 701 represents angular rotor position in electrical degrees, whereas the horizontal axis represents 702 time. In FIG. 7A, the estimated or observed arc-tangent derived rotor position estimate 703 is shown in a solid line that is representative of a substantially triangular waveform. Meanwhile, the ideal or actual angular rotor position 706 is illustrated as a dashed line that is representative of substantially triangular waveform. The derived rotor position estimate 703 varies about the actual angular rotor position because of noise associated with the observed arc-tangent derived rotor position estimate 703. Both the observed arc-tangent derived rotor position estimate 703 and the actual angular rotor position have a transition region or trailing edge 704 associated with a transition from a 360-degree angular position and a zero-degree angular position of the next rotation of the rotor. As illustrated in FIG. 7A and in FIG. 7B, the variation, fluctuation or error in the respective waveforms for the arc-tangent derived rotor position estimate 703 and the derived rotor position estimate 707 is exaggerated for illustrative purposes and the actual variation, fluctuation or error may differ in practice in accordance with the applicable noise associated with the observed or measured phase signals of the input terminals of the machine (e.g., motor 117), among other factors.

FIG. 7B illustrates a vector cross product or mixed (e.g., heterodyned) observer position estimation in accordance with this disclosure. Like reference numbers in FIG. 7A and FIG. 7B indicate like elements or features. The derived rotor position estimate 707 is based on the estimator (358 or 458) rather than the art-tangent derived method. Accordingly, the derived rotor position estimate 707 is associated with less noise as indicated by less variation in the solid line with respect to the actual angular rotor position 706.

Figure 8:
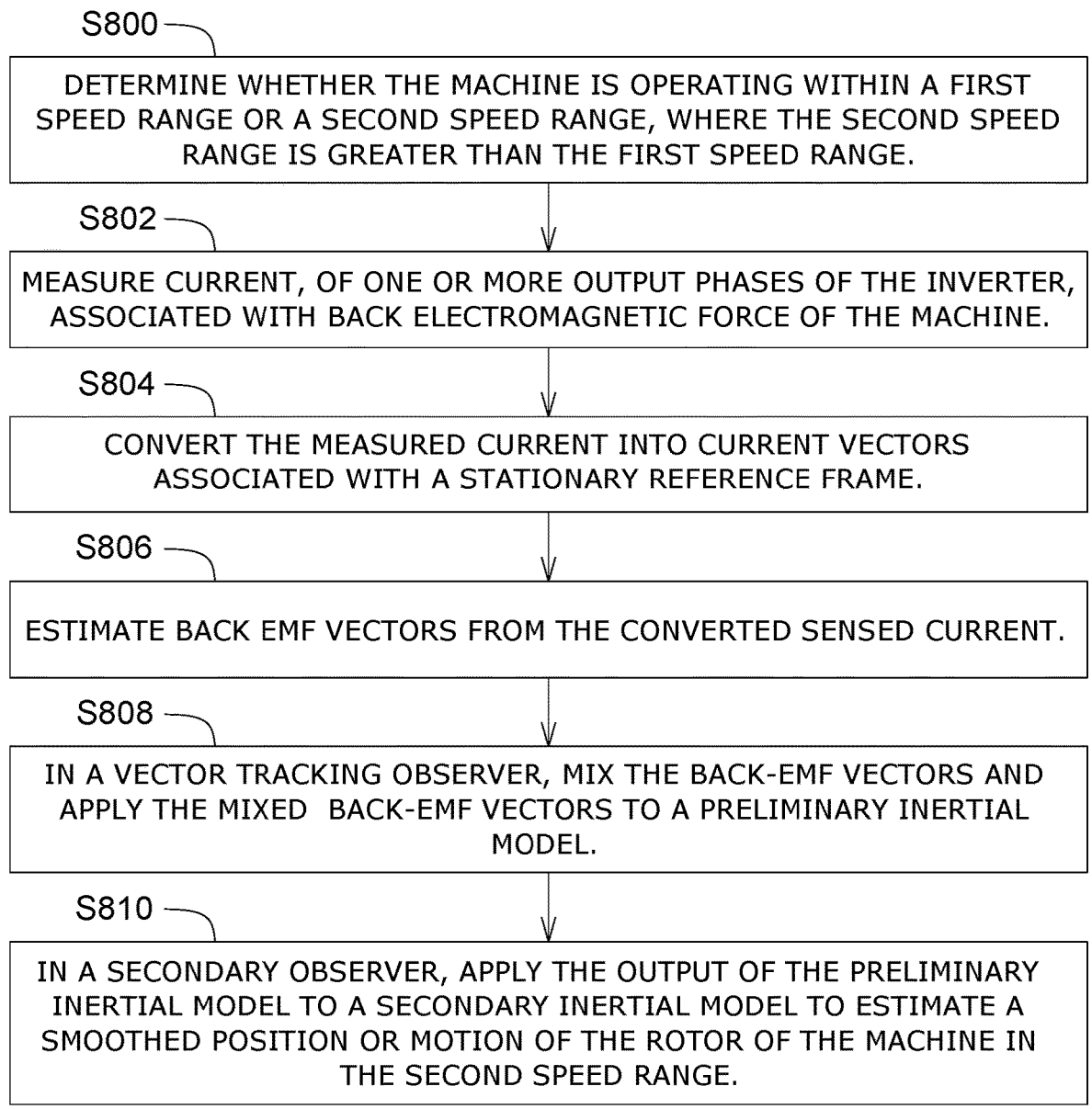
FIG. 8 is a flow chart of one embodiment of a method for controlling a permanent magnetic machine without a mechanical position sensor.

FIG. 8 is a flow chart of one embodiment of a method for controlling a permanent magnetic machine without a mechanical position sensor. The method of FIG. 8 begins in step S800.

In step S800, a state evaluator, estimator (358 or 458) or data processor 264 determines whether the machine is operating within a first speed range or a second speed range, where the second speed range is greater than the first speed range.

In step S802, a sensor is configured to sense current, or an equivalent voltage, of one or more output phases of an inverter, associated with back electromotive force (back EMF) of the machine.

In step S804, a back-EMF module 360, a converter or electronic data processor 264 is adapted to convert the derived or sensed current into current vectors associated with a stationary reference frame.

In step S806, a back-EMF module 360, an estimator (358 or 458) or an electronic data processor 264 is configured to estimate back-EMF vectors from the converted current vectors. For example, the back-EMF module 360 comprises a back electromotive force filter module that filters the converted sensed current vectors to output filtered back EMF vectors.

In step S808, a vector tracking observer 362 or the electronic data processor 264 is adapted to mix (e.g., heterodyne or apply a vector cross product) the back-EMF vectors and applying the mixed (e.g., heterodyned) back-EMF vectors to a preliminary inertial model. For example, the vector tracking observer 362 mixes or heterodynes the filtered sensed back-EMF vectors and an estimated initial current state output of the vector tracking observer 362 by taking a vector cross product of the filtered sensed back-EMF vectors and the estimated output of the vector tracking observer 362 to output a differential or final back-EMF state output (e.g., a cross-product indicative of error in the position).

In step S810, a secondary observer 364 or the data processor 264 is operable to apply the output of the preliminary inertial model to a secondary inertial model in the second speed range to estimate position or motion data for the rotor (e.g., a smoothed position of the rotor of the machine versus time, rotor velocity, or rotor acceleration). For example, the vector tracking observer 362 applies the differential or final current state output to secondary observer 364, where the secondary observer 364 comprises a modified Luenberger observer that outputs a generally saw-tooth waveform indicative of the rotor position versus time, and where a noise level is less than a minimum threshold of signal-to-noise ratio of the saw-tooth waveform. In another example, the secondary observer 364 applies an inertial model to the differential or final current state to output a generally saw-tooth waveform indicative of the rotor position versus time, where a noise level is less than a minimum threshold of signal-to-noise ratio of the saw-tooth waveform.

Figure 9:
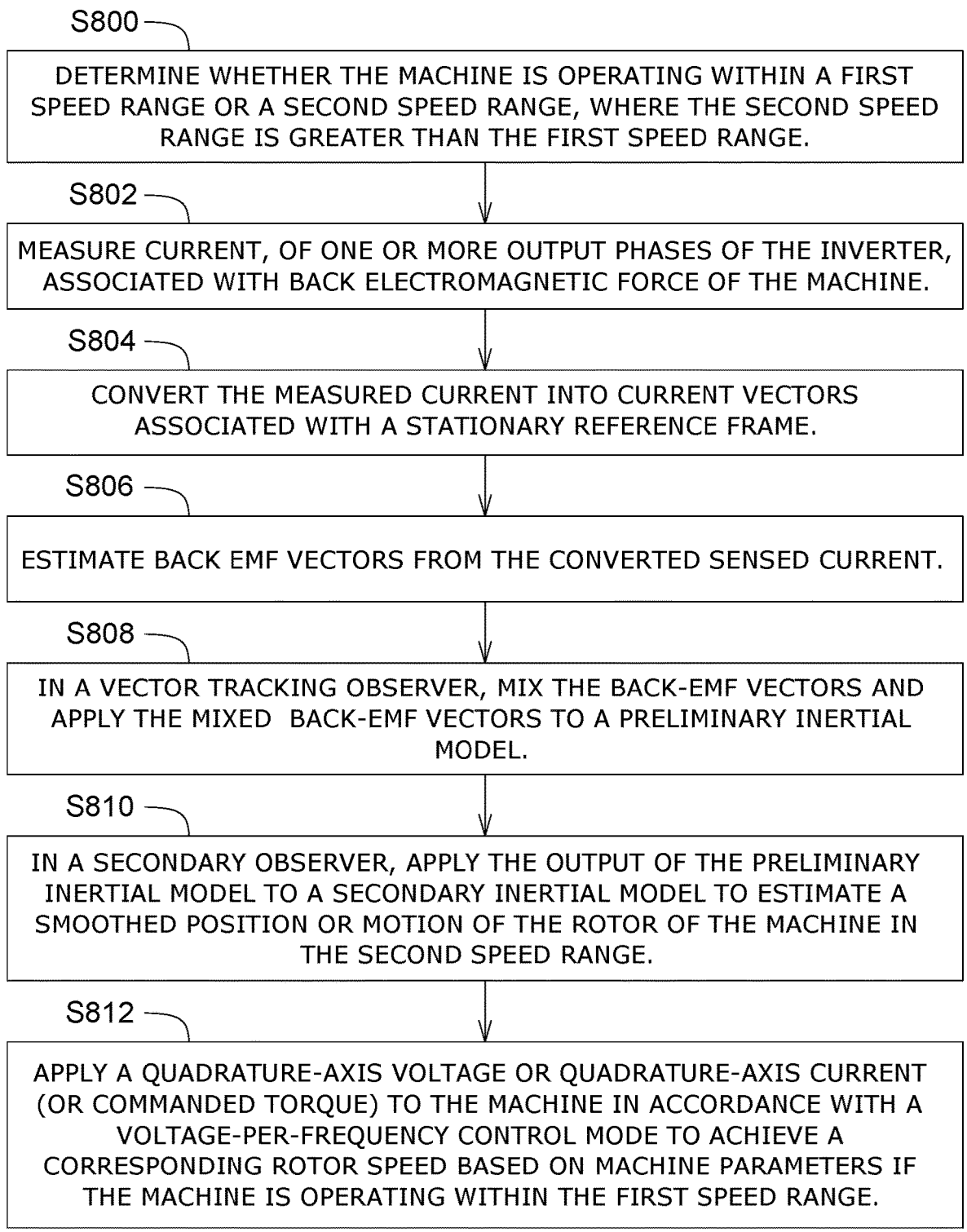
FIG. 9 is a flow chart of another embodiment of a method for controlling a permanent magnetic machine without a mechanical position sensor.

FIG. 9 is a flow chart of another embodiment of a method for controlling a permanent magnetic machine without a mechanical position sensor. The method of FIG. 9 is similar to the method of FIG. 8 except the method of FIG. 9 further includes the step S812.

In step S812, the pulse-width modulation generation module 112 or inverter switching circuit 188 applies a quadrature-axis voltage or quadrature-axis current (or commanded torque) to the machine to achieve a corresponding rotor speed based on machine parameters if the machine is operating within the first speed range. For example, the machine parameters may comprise the machine inductance ($L_s$) in the synchronous d-q reference frame (not the alpha-beta stationary reference frame), the resistance (R) per phase of the stator windings, and the flux linkage ($\lambda_{PM}$) of the permanent magnets (not between stator and the rotor).

Step S812 may be carried out in accordance with various techniques for control of the machine in the first speed range, which may be applied separately or cumulatively. Under a first technique, the pulse-width modulation generation module 112 or inverter switching circuit 188 applies a quadrature-axis current, or equivalent quadrature-axis voltage, in a Voltage-per-frequency control mode (e.g., Volts/Hertz control mode), that is in accordance with the following equation:

$$f(\omega, i_q) = (\omega^2 L_s^2 + R^2)i_q^2 + 2R\omega\lambda_{pm}i_q - \frac{\omega^4 \lambda_{pm}^2 L_s^2}{(\omega^2 L_s^2 + R^2)} \leq 0,$$

where $\omega$ is rotor speed, expressed as rotor electrical speed, $L_s$ is the machine inductance in the synchronous d-q reference frame, R is the resistance per phase of the stator windings, $i_q$ is the quadrature-axis current $\lambda_{PM}$ is the flux linkage of the magnets in the machine. Under a second technique, the pulse-width modulation generation module 112 or inverter switching circuit 188 the applied quadrature-axis current, or equivalent quadrature-axis voltage, in a Voltage/Hertz control mode is in accordance with the following equation:

$$f(\omega, T_e) = \frac{(\omega^2 L^2 + R^2)}{k_f^2}T_e^2 + \frac{2R\omega\lambda_{pm}}{k_t}T_e - \frac{\omega^4 \lambda_{pm}^2 L_s^2}{(\omega^2 L_s^2 + R^2)} \leq 0,$$

where $T_e$ is commanded torque, where $\omega$ is rotor speed, expressed as rotor electrical speed, $L_s$ is the machine inductance in the synchronous d-q reference frame, R is the resistance per phase of the stator windings, $k_t$ is sampling time interval $\lambda_{PM}$ is the flux linkage of the magnets in the machine.

Under a third technique, electronic data processing system supports a transition state in which a torque load on the machine less than a torque load threshold to effectuate a transition in which a rotational position of the rotor shaft is aligned based on a first position estimate associated with the first control mode (e.g., V/Hz in spec) and a second position estimate (e.g., in FOC or SVPWM with estimates based on position estimator (358 or 458) with vector tracking observer 362 and secondary observer 364) associated with the second control mode, the transition between the position between a first control mode in the first speed range and a second control mode in the second speed range.

Figure 10:
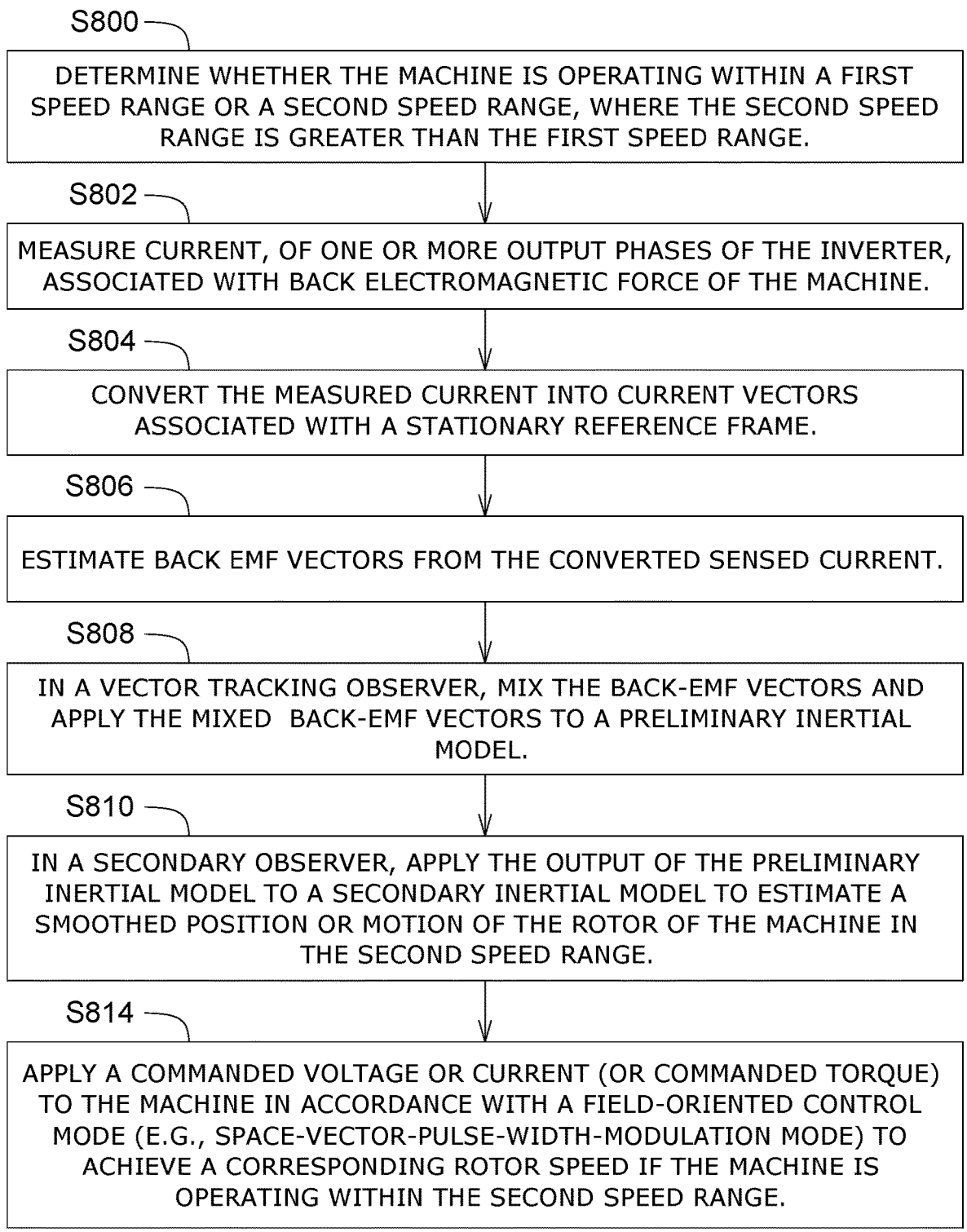
FIG. 10 is a flow chart of yet another embodiment of a method for controlling a permanent magnetic machine without a mechanical position sensor.

FIG. 10 is a flow chart of another embodiment of a method for controlling a permanent magnetic machine without a mechanical position sensor. The method of FIG. 10 is similar to the method of FIG. 8 except the method of FIG. 10 further includes the step S814.

In step S814, the pulse-width modulation generation module 112 or inverter switching circuit 188 applies a commanded voltage or current (or commanded torque) to the machine in accordance with a field-oriented control mode (e.g., space-vector-pulse-width-modulation mode) to achieve a corresponding rotor speed if the machine is operating with the second speed range.

In a second speed range, the method may be carried out in accordance with various processes, which may be applied separately or cumulatively. Under a first process, the pulse width modulation generation module 112 or the inverter switching circuit 188 applies a commanded current or commanded voltage to the machine via the inverter switching module based on the sensed smoothed position of the rotor of the machine versus time or the smoothed, estimated rotor speed. Under a second process, the commended current or commanded current is consistent with a space-vector-pulse-width-modulation signal or field-oriented-control (FOC) command. Under a third process, electronic data processing system supports a transition state in which a torque load on the machine less than a torque load threshold to effectuate a transition in which a rotational position of the rotor shaft is aligned based on a first position estimate associated with the first control mode (e.g., V/Hz mode) and a second position estimate (e.g., in FOC or SVPWM) with estimates based on position estimator (358 or 458) with vector tracking observer 362 and secondary observer 364) associated with the second control mode, the transition between the position between a first control mode in the first speed range and a second control mode in the second speed range.

Having described the preferred embodiment, it will become apparent that various modifications can be made without departing from the scope of the invention as defined in the accompanying claims.

The following is claimed:

1. A method for controlling a permanent magnet machine with plurality of permanent magnets over successive sampling time periods, the method comprising:
   determining whether the machine is operating within a first speed range or a second speed range, where the second speed range is greater than the first speed range;
   sensing current, of one or more output phases of an inverter, associated with back electromotive force of the machine;
   converting the sensed current into current vectors associated with a stationary reference frame;
   estimating back-electromotive force (EMF) vectors from the converted sensed current to derive an average rotor position over a sampling time period;
   in a vector tracking observer, mixing an observer output and an observer input, where the observer output comprises the average rotor position and where the observer input is a rotor position derived from back-EMF vectors and applying a resultant cross product from the mixing to a preliminary inertial model that comprises a time discrete model based on an estimated torque, an inertial machine parameter and the rotor position; and
   in a secondary observer, applying the observer output of the preliminary inertial model to a secondary inertial model in the second speed range to estimate a smoothed position of the rotor of the machine versus time, wherein a signal indicative of the smoothed position of the rotor versus time has a noise level that is less than a minimum threshold of a signal-noise ratio of the signal.

2. The method according to claim 1 further comprising:
   applying a quadrature-axis voltage or quadrature-axis current to the machine to achieve a corresponding rotor speed based on machine parameters if the machine is operating within the first speed range.

3. The method according to claim 2 wherein the machine parameters comprise the machine inductance ($L_s$) in the synchronous d-q reference frame, the resistance (R) per phase of the stator windings, and the flux linkage ($\lambda_{PM}$) of the permanent magnets.

4. The method according to claim 2 wherein the applied quadrature-axis current in a Voltage/Hertz control mode is in accordance with the following equation:

$$f(\omega, i_q) = (\omega^2 L_s^2 + R^2)i_q^2 + 2R\omega\lambda_{pm}i_q - \frac{\omega^4 \lambda_{pm}^2 L_s^2}{(\omega^2 L_s^2 + R^2)} \leq 0,$$

where $\omega$ is rotor speed, $L_s$ is the machine inductance in the synchronous d-q reference frame, R is the resistance per phase of the stator windings, $i_q$ is the quadrature-axis current, $\lambda_{PM}$ is the flux linkage of the magnets in the machine.

5. The method according to claim 1 further comprising:
applying a commanded current or commanded voltage to the machine via an inverter switching module based on the sensed smoothed position of the rotor of the machine versus time.

6. The method according to claim 5 wherein the commended current or commanded current is consistent with a space-vector-pulse-width-modulation signal.

7. The method according to claim 1 further comprising:
filtering, by a back electromotive force filter module, the converted sensed current vectors to output filtered back-EMF vectors where $H_{\alpha\beta}$ is a filtering response vector for the back EMF vector;
applying the vector tracking observer to mix or heterodyne the filtered sensed back-EMF vectors of the vector tracking observer by taking a vector cross product of the filtered sensed back-EMF vectors and the estimated output of the vector tracking observer to output a differential or final back-EMF state output indicative of an error in the rotor position.

8. The method according to claim 7 further comprising:
applying the differential or final current state output to the secondary observer.

9. The method according to claim 8 wherein the secondary observer comprises a Luenberger observer that outputs a generally saw-tooth waveform indicative of the rotor position versus time, where the noise level is less than the minimum threshold of signal-to-noise ratio of the saw-tooth waveform.

10. The method according to claim 8 wherein the secondary observer applies the preliminary inertial model to the differential or final current state to output a generally saw-tooth waveform indicative of the rotor position versus time, where the noise level is less than the minimum threshold of signal-to-noise ratio of the saw-tooth waveform.

11. The method according to claim 1 further comprising a transition state in which a torque load on the machine less than a torque load threshold to effectuate a transition in which a rotational position of the rotor shaft is aligned based on a first position estimate associated with a first control mode and a second position estimate associated with a second control mode, wherein the first control mode is in the first speed range and the second control mode is in the second speed range.

12. A system for controlling a permanent magnet machine with plurality of permanent magnets over successive sampling time periods, the system comprising:
a state evaluator adapted to determine whether the machine is operating within a first speed range or a second speed range, where the second speed range is greater than the first speed range, the state evaluator stored in a data storage device;
at least one sensor for sensing current, of one or more output phases of an inverter, associated with back electromotive force of the machine;
a converter configured to transform or convert the sensed current into current vectors associated with a stationary reference frame;
a back electromotive force module configured to estimate back-electromotive force (EMF) vectors from the converted sensed current to derive an average rotor position over sampling time period, where $E_{\alpha\beta}$ is a complex back-electromotive force vector for the stationary reference frame components;
a vector tracking observer, an electronic data processor or a mixer configured to mix an observer output and an observer input, where the observer output comprises the average rotor position and where the observer input is a rotor position derived from the back-EMF vectors and the vector tracking observer configured to apply a resultant cross product from the mixed back-EMF vectors to a preliminary inertial model; and
a secondary observer or the electronic data processor configured to apply the observer output of the preliminary inertial model to a secondary inertial model in the second speed range to estimate a smoothed position of the rotor of the machine versus time, wherein a signal indicative of the smoothed position of the rotor versus time has a noise level that is less than a minimum threshold of a signal-noise ratio of the signal.

13. The system according to claim 12 further comprising:
in a first control mode the electronic data processor is configured to apply a quadrature-axis voltage or quadrature-axis current to the machine to achieve a corresponding rotor speed based on machine parameters if the machine is operating within the first speed range.

14. The system according to claim 13 wherein the machine parameters comprise the machine inductance ($L_s$) in the synchronous d-q reference frame, the resistance (R) per phase of the stator windings, and the flux linkage ($\lambda_{PM}$) of the permanent magnets.

15. The system according to claim 13 wherein the applied quadrature-axis current, in a Voltage/Hertz control mode is in accordance with the following equation:

$$f(\omega, i_q) = (\omega^2 L_s^2 + R^2)i_q^2 + 2R\omega\lambda_{pm}i_q - \frac{\omega^4 \lambda_{pm}^2 L_s^2}{(\omega^2 L_s^2 + R^2)} \leq 0,$$

where $\omega$ is rotor speed, $L_s$ is the machine inductance in the synchronous d-q reference frame, R is the resistance per phase of the stator windings, $i_q$ is the quadrature-axis current, $\lambda_{PM}$ is the flux linkage of the magnets in the machine.

16. The system according to claim 13 further comprising:
in a second control mode, the electronic data processor configured to apply a commanded current or commanded voltage to the machine via an inverter switching module based on the sensed smoothed position of the rotor of the machine versus time.

17. The system according to claim 16 wherein the commanded current or commanded voltage is consistent with a space vector pulse width modulation signal.

18. The system according to claim 12 further comprising:
the back electromotive force module comprising a filter module configured to filter the converted sensed current vectors to output filtered back EMF vectors, where $H_{\alpha\beta}$ is a filtering response vector for the back EMF vector;

the vector tracking observer for applying the vector tracking observer to mix or heterodyne the rotor position derived from filtered back EMF vectors and the average rotor position derived from back EMF vectors to output the resultant cross product indicative of error in the rotor position.

19. The system according to claim 18 further comprising: the secondary observer configured to process the differential or final current state.

20. The system according to claim 19 wherein the secondary observer comprises a Luenberger observer that outputs a generally saw-tooth waveform indicative of the rotor position versus time, where the noise level is less than the minimum threshold of signal-to-noise ratio of the saw-tooth waveform.

21. The system according to claim 18 wherein the secondary observer applies the preliminary inertial model to the differential or final current state to output a generally saw-tooth waveform indicative of the rotor position versus time, where the noise level is less than the minimum threshold of signal-to-noise ratio of the saw-tooth waveform.

22. The system according to claim 12 wherein the electronic data processor manages or controls a transition state in which a torque load on the machine less than a torque load threshold to effectuate a transition in which a rotational position of the rotor shaft is aligned based on a first position estimate associated with a first control mode and a second position estimate associated with a second control mode, wherein the first control mode is in the first speed range and the second control mode is in the second speed range.

* * * * *